Nov. 8, 1966
E. C. ROLLINS
3,283,895
BEET CLEANING APPARATUS
Filed May 18, 1964
3 Sheets-Sheet 2
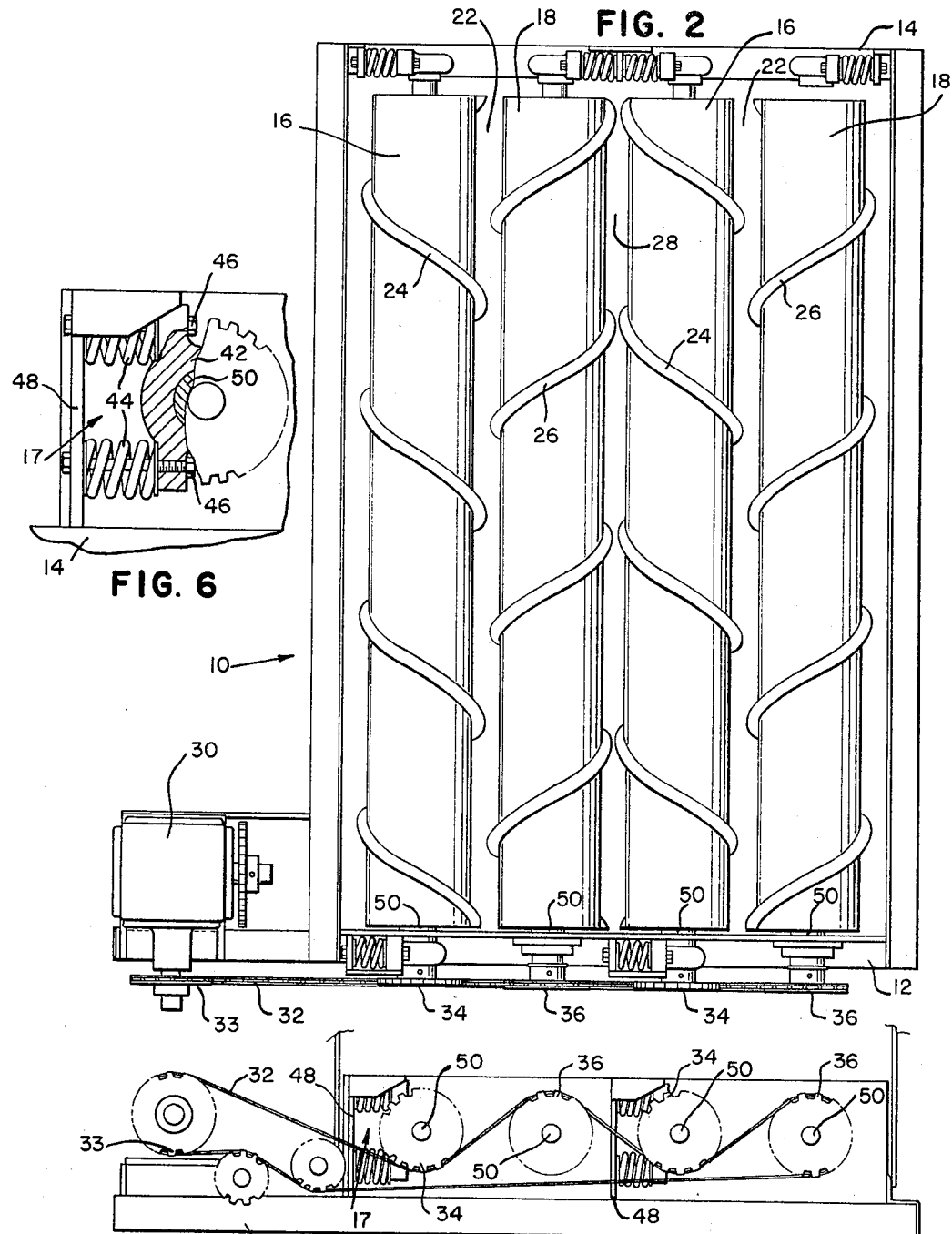
INVENTORS
EUGENE C. ROLLINS
BY
Mellin, Moore & Weissenberger
ATTORNEYS

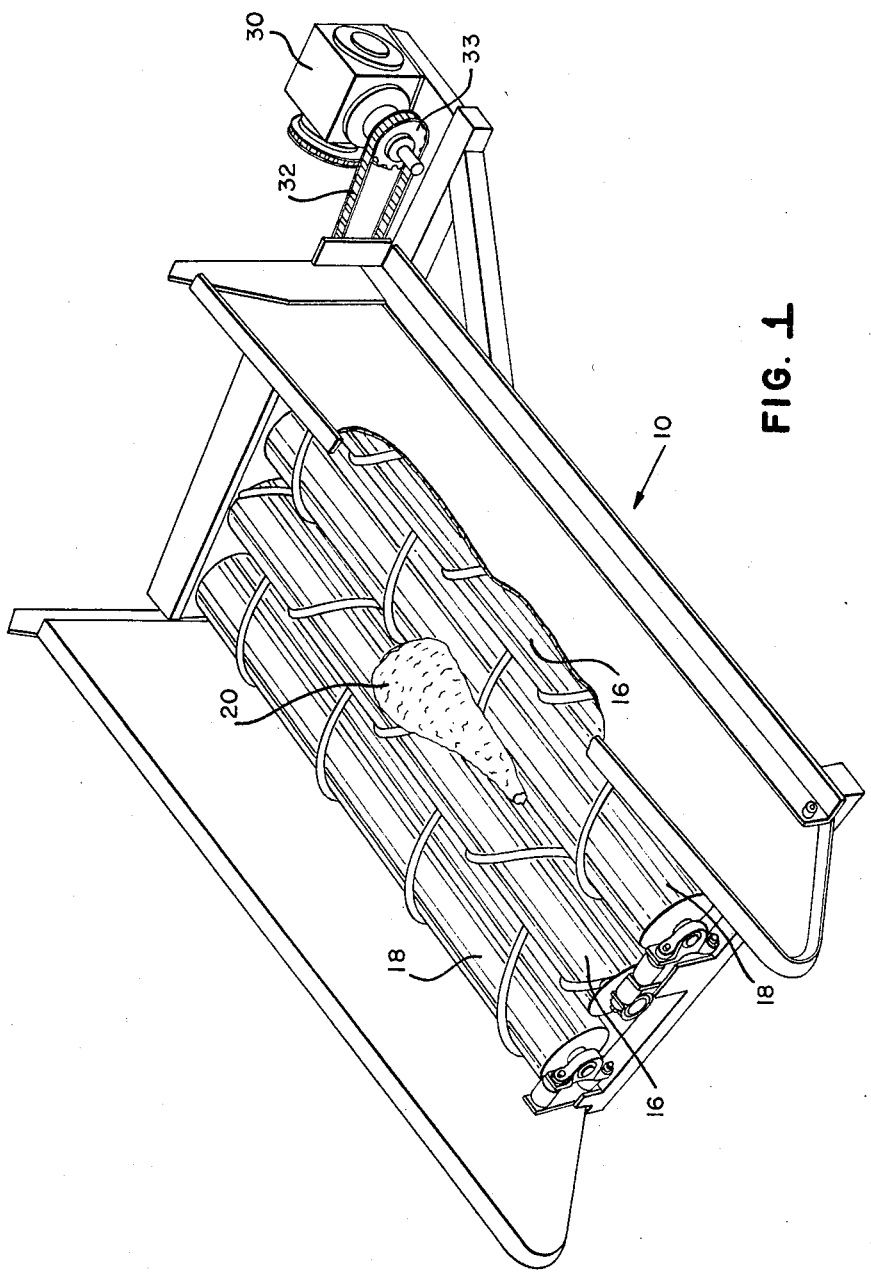

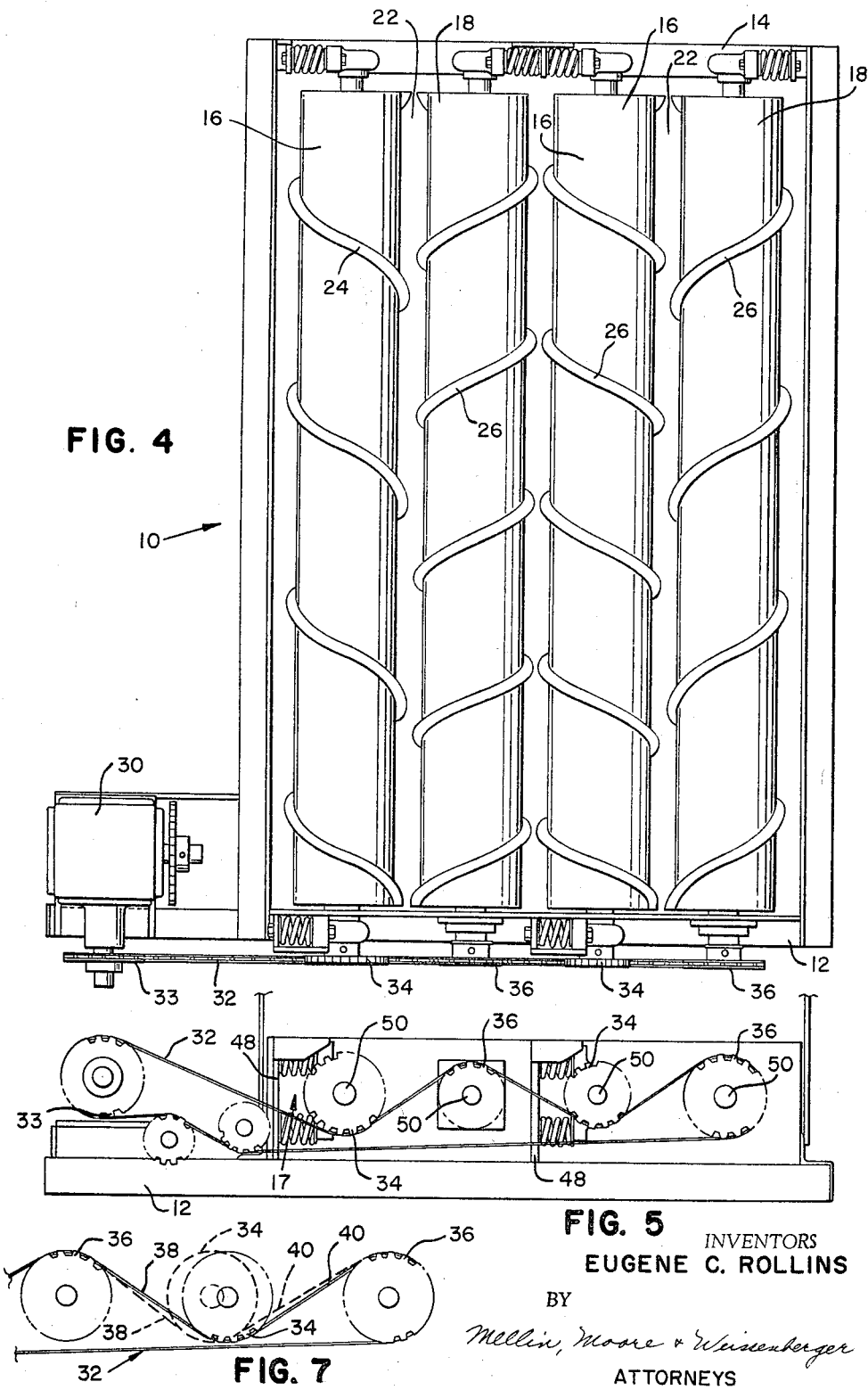

United States Patent Office 3,283,895
Patented Nov. 8, 1966

3,283,895
BEET CLEANING APPARATUS
Eugene C. Rollins, Ogden, Utah, assignor to Hesston Manufacturing Co., Inc., Hesston, Kans., a corporation of Kansas
Filed May 18, 1964, Ser. No. 368,203
3 Claims. (Cl. 209—107)

This invention relates to beet cleaning conveyors, and more particularly conveyors of the type having counter-rotating driven rollers disposed adjacent to one another and having helical conveying ridges formed thereon.

In the harvesting of beets or other tuberous plants, the harvesting machine conventionally digs up the tuber and deposits it on a conveyor with clods of dirt or mud attached thereto. In order to process the beets efficiently, it is first necessary to separate them from the major portion of the adhering clods. This operation is accomplished on a cleaning conveyor which consists of a series of adjacent counter-rotating rollers which roll the beets and remove the clods from their sides by friction or impact while conveying them axially of the rollers. Movement of the beets along the conveyor is accomplished by helical ridges which push the beets lengthwise of the rollers as the rollers rotate. In the process, the clods fall through the interstices between the rollers, whereas the much larger beets remain on top of the conveyor.

Due to the fact that rocks ocassionally reach the conveyor surface, it is desirable to make the rollers resiliently separable to a limited degree to prevent jamming of the mechanism by rocks which are too small to be conveyed, and yet just a little too large to fall through the interstices between the rollers. Such and arrangement, however, does present drive problems which heretofore have admitted only of uneconomically expensive solutions. It is essential that adjacent rollers turn at precisely the relative speed to one another which is dictated by the pitch ratio of their helical ridges. At the same time, the drive must be responsive to sudden resilient movement of the rollers so that there is no danger of jumping a tooth when a sudden motion of the roller takes place.

The present invention solves this problem by providing a chain drive so arranged that each roller sprocket is engaged by the chain through an arc of about 90° to guard against jumping, and that the total length of the drive run of the chain does not vary significantly when the rollers move to the limit of their resilient movement in the plane of conveying.

In many instances, particularly under conditions of high humidity, the soil stripped from the beets tends to adhere to the rollers and to build up to a thickness which impairs the conveying effectiveness and finally jams the mechanism. In accordance with one aspect of the invention, this build-up is prevented by rotating adjacent rollers at different speeds, whereby the soil accumulations on adjacent rollers, instead of being compacted against each other, are continuously frictionally abraded.

It is, therefore, the primary object of this invention to provide a beet cleaning conveyor in which the cleaning rollers are resiliently movable in the plane of conveying to prevent jamming.

It is a further object of the invention to provide a beet cleaning conveyor in which adjacent cleaning rollers turn at different speeds.

It is still another object of the invention to provide a drive mechanism for beet cleaning conveyors which allows one or both of the aforementioned objects to be accomplished.

This and other objects of this invention will become apparent from the following specification, taken in connection with the accompanying drawings, in which:

FIG. 1 is a cutaway perspective view of one embodiment of the conveyor of this invention;
FIG. 2 is a plan view of the same embodiment;
FIG. 3 is a side elevation of the drive mechanism of the embodiment of FIG. 2;
FIG. 4 is a plan view of another embodiment of the invention;
FIG. 5 is a side elevation of the drive mechanism of the embodiment of FIG. 4;
FIG. 6 is a detail side elevation of the resilient mounting means of the rollers; and
FIG. 7 is an exaggerated schematic view illustrating the functioning of the drive mechanism.

Basically, the invention has three distinct aspects: the provision of horizontally resilient mounting means for the conveying rollers to permit them to yield under a potential jamming stress; the provision of a zig-zag chain drive to maintain the relative positions of the helical ridges while allowing the rollers to move horizontally without requiring a compensating mechanism; and, optionally, the provision of helical ridges of different pitch on adjacent rollers to allow the ridges to maintain their relative position in spite of different rotational speeds of adjacent rollers.

Referring now to FIG. 1, the device of this invention is generally shown at 10. The device 10 consists basically of frame members 12, 14 which support rollers 16, 18. The rollers 16 rotate clockwise and the rollers 18 rotate counterclockwise in FIG. 3 to roll the beets 20 about their longitudinal axis during their conveyance in a direction longitudinal of the rollers. In the process of this conveying motion, any adhering soil fragments are knocked down into the space 22 (FIG. 2) between the rollers 16 and 18. Helical protuberances or ridges 24, 26 are provided on the rollers 16, 18 to impart the conveying motion to the beets 20.

In the normal unstressed position of the rollers 16, 18, helical ridges 24, 26 are longitudinally displaced from one another as best shown in FIG. 2. To maintain this relative position, it is imperative that the relative angular position of adjacent rollers be precisely controlled even under impact stress conditions. In order to prevent jamming or surface damage by rocks just slightly larger than the space 22 (much larger rocks would be conveyed along the conveyor in the same manner as the beets 20), the rollers 16, 18 are spring-mounted in bearings 17 for limited horizontal movement as best shown in FIG. 6. The resilient movement transverse to the direction of conveying thus permitted is in such a direction as to widen the space 22 and to narrow the space 28. The latter is of no consequence because the direction of rotation of the rollers 16, 18 is such that the motion of the roller surfaces bordering the space 28 is up rather than down, so nothing gets caught in space 20 anyway.

To achieve a positive angularly controlled drive even under sudden impact motion, the invention provides for a chain drive whose operation is best illustrated in FIG. 7. A motor or other driving device 30 drives a chain 32 by means of a drive sprocket 33. The chain 32 is entrained alternately under and over the roller sprockets 34, 36 on its driving run and is straight on its return run.

This arrangement has several purposes: for one, it assures positive gripping of the sprockets by the chain because the chain engages each sprocket through an angle of about 90°; second, it provides for the counter-rotation of adjacent roller sprockets 34, 36; third, it provides a driving run pattern as exaggeratedly illustrated in FIG. 7 in which the total length of the driving run of the chain 32 stays substantially constant as the rollers move horizontally. This is so because for the limited movement of the rollers involved here, the chain path section 38 shortens upon movement of the roller 16 by about the same amount as the section 40 lengthens (dotted lines in FIG. 7).

FIG. 6 illustrates one of the spring-mounted bearings 17 which consists of a saddle 42 supported by springs 44 and bolts 46 on bracket 48 which is formed integrally with frame member 14. This saddle 42 in turn supports the roller shaft 50.

In the alternative embodiment of FIGS. 4 and 5, the rollers 16 are driven at a different speed than the rollers 18. The difference in speed need not be great, as its purpose is merely to create an abrasive friction between any mud coating which might build up on a roller 16 and one which might build up on an adjacent roller 18.

For this purpose, it is necessary to make the pitch of the helical ridges 24 different from that of the ridges 26 so that the two will mesh in the respective rotating speeds of rollers 16, 18. The difference in rotational speed, in turn, is achieved merely by making the sprockets 34 of a different diameter than the sprockets 36, as best shown in FIG. 5. The operation of the drive mechanism, illustrated in FIG. 7, remains the same as the same principles are applicable.

It should be understood that the present invention can be carried out in many different ways, of which the embodiments shown and described herein are merely illustrative. I therefore do not desire to be limited by the embodiments discussed herein, by only by the scope of the following claims.

What I claim and desire to secure by Letters Patent is:

1. A beet cleaning apparatus comprising in combination:
   two adjacent pairs of elongated rollers disposed in juxtaposed parallelism and lying in a common plane;
   suspension means for said rollers including yieldable means arranged to allow for independent limited resilient movement in the plane of conveying of at least one roller of each adjacent pair;
   drive sprockets on one end of each of said rollers; and
   a chain drive for said rollers having a continuous chain engaging, on its driving run, alternately the tops and bottoms of adjacent sprockets and arranged to impart rotation to said rollers so that the opposed surfaces of each pair of rollers are moved downwardly relative to an upright plane between the pair when said chain drive is moved in one direction, said yieldable means being disposed to permit movement of the corresponding rollers in the direction of movement of said chain drive run when the latter is moved in said one direction whereby movement of the chain drive enhances the tendency of one roller of each pair to move away from its corresponding roller.

2. The apparatus as set forth in claim 1 wherein said suspension means includes yieldable means resiliently mounting one of the rollers of each pair at the end of said rollers proximal said chain drive, and means mounting the other roller of each pair to prevent shifting movement of the roller whereby the tension of said chain drive is maintained relatively uniform at all times.

3. The apparatus as set forth in claim 2, said suspension means including yieldable means resiliently mounting the ends of said rollers remote from said chain drive for limited independent shifting movement away from the corresponding roller of each pair thereof.

References Cited by the Examiner

UNITED STATES PATENTS

| | | | |
|---|---|---|---|
| 669,727 | 3/1901 | Fuller | 130—5 |
| 891,225 | 6/1908 | Anderson | 209—107 |
| 2,239,458 | 4/1941 | Hetzel | 171—58 X |
| 2,608,815 | 9/1952 | Graaff | 198—213 X |
| 2,618,385 | 11/1952 | Silver et al. | 209—107 |
| 2,861,686 | 11/1958 | Johnson | 209—107 X |
| 2,869,714 | 1/1959 | Williams | 198—213 |

EVON C. BLUNK, *Primary Examiner.*

R. J. HICKEY, *Assistant Examiner.*